United States Patent
Wang

(10) Patent No.: US 9,899,164 B1
(45) Date of Patent: Feb. 20, 2018

(54) LUMINOUS KEYBOARD HAVING PLURAL LIGHT GUIDE COVERS CORRESPONDING TO KEY STRUCTURES

(71) Applicant: PRIMAX ELECTRONICS LTD., Taipei (TW)

(72) Inventor: Yi-Chen Wang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 15/459,280

(22) Filed: Mar. 15, 2017

(30) Foreign Application Priority Data

Dec. 9, 2016 (TW) .............................. 105140841 A

(51) Int. Cl.
*H01H 13/02* (2006.01)
*H01H 13/83* (2006.01)
*H01H 13/7065* (2006.01)
*F21V 8/00* (2006.01)

(52) U.S. Cl.
CPC ........... *H01H 13/83* (2013.01); *G02B 6/0083* (2013.01); *G02B 6/0088* (2013.01); *H01H 13/023* (2013.01); *H01H 13/7065* (2013.01); *H01H 2219/062* (2013.01)

(58) Field of Classification Search
CPC .. H01H 13/83; H01H 18/023; H01H 2219/06; H01H 2219/062; H01H 2219/064; H01H 2219/014; H01H 2219/036; H01H 2219/04
USPC ....... 200/310, 311, 314; 362/23.03; 345/170
See application file for complete search history.

(56) References Cited

U.S. PATENT DOCUMENTS

| 4,806,908 A * | 2/1989 | Krupnik ................ G06F 3/0238 200/302.2 |
| 6,648,530 B2 * | 11/2003 | Kamei ................. G06F 1/1616 341/22 |

* cited by examiner

*Primary Examiner* — Vanessa Girardi
(74) *Attorney, Agent, or Firm* — Kirton McConkie; Evan R. Witt

(57) ABSTRACT

A luminous keyboard includes a membrane wiring board, plural key structures, and plural light-emitting elements and plural light guide covers corresponding to the plural key structures. Each key structure includes a keycap and an elastic element. Each light guide cover is disposed under the corresponding keycap and surrounds the corresponding elastic element. Each light guide cover receives plural light beams from the corresponding light-emitting element. The plural light beams are guided to the corresponding keycap by the light guide cover and outputted from plural light-transmissible regions of the corresponding keycap. Consequently, the plural light-transmissible regions have uniform luminous efficacy.

10 Claims, 7 Drawing Sheets

LUMINOUS KEYBOARD HAVING PLURAL LIGHT GUIDE COVERS CORRESPONDING TO KEY STRUCTURES

FIELD OF THE INVENTION

The present invention relates to a keyboard, and more particularly to a luminous keyboard with an illuminating function.

BACKGROUND OF THE INVENTION

Recently, with the increasing development of information industries, portable information devices such as notebook computers, mobile phones or personal digital assistants are possibly used in various environments. In case that a portable information device is used in a dim environment, the numbers and the characters marked on the keys of the keyboard of the portable information device are not clearly visible. In other words, the dim environment becomes hindrance from operating the keyboard. In addition, if the numbers and the characters marked on the keys of the keyboard are reluctantly viewed in the dim environment, the user is readily suffered from vision impairment. For solving these drawbacks, a luminous keyboard has been disclosed. The luminous keyboard can be used in the dim environment in order to increase the applications thereof. By changing the layout of the luminous regions of the luminous keyboard, the information device having the luminous keyboard is more aesthetically-pleasing and thus the marketing competiveness is enhanced. Moreover, according to some specified professional demands (e.g., electronic sports demands), the keyboard generates identical light color or different light colors to indicate the keys of the keyboard. Consequently, the keyboard brings better operating efficacy to the user.

Please refer to FIGS. 1, 2 and 3. FIG. 1 is a schematic side view illustrating a conventional luminous keyboard. FIG. 2 is a schematic exploded view illustrating a membrane wiring board of the conventional luminous keyboard of FIG. 1. FIG. 3 is a schematic exploded view illustrating a key structure of the conventional luminous keyboard of FIG. 1. The luminous keyboard of FIG. 1 is designed according to a professional demand such as a gaming demand. The conventional luminous keyboard 1 comprises a metallic base plate 13, a membrane wiring board 14, plural key structures 15 and plural light-emitting elements 16. The membrane wiring board 14 comprises a lower wiring plate 141, an upper wiring plate 142, and an intermediate plate 143. The intermediate plate 143 is arranged between the lower wiring plate 141 and the upper wiring plate 142. The lower wiring plate 141 comprises a first circuit pattern 1411. The first circuit pattern 1411 comprises plural silver paste conductor lines 14111 and plural lower contacts 14112. The upper wiring plate 142 comprises a second circuit pattern 1421. The second circuit pattern 1421 comprises plural silver paste conductor lines 14211 and plural upper contacts 14212. The intermediate plate 143 comprises plural perforations 1431 corresponding to the plural lower contacts 14112 and the plural upper contacts 14212, respectively. Each of the upper contacts 14212 and the corresponding lower contact 14112 are collectively defined as a membrane switch 144.

The metallic base plate 13 is disposed under the membrane wiring board 14. The plural key structures 15 are connected with the metallic base plate 13. The plural key structures 15 are aligned with the corresponding membrane switches 144. Each key structure 15 comprises a keycap 151, a connecting element 153 and an elastic element 152. The connecting element 153 is connected between the corresponding keycap 151 and the metallic base plate 13. Consequently, the keycap 151 is movable upwardly or downwardly relative to the membrane wiring board 14. The elastic element 152 is arranged between the corresponding keycap 151 and the membrane wiring board 14. Moreover, the elastic element 152 comprises a sustaining part 1521.

As the keycap 151 of any key structure 15 is depressed and moved downwardly relative to the membrane wiring board 14, the elastic element 152 is compressed by the keycap 151. Consequently, the corresponding upper contact 14212 of the membrane wiring board 14 is pushed by the sustaining part 1521 of the elastic element 152. Moreover, the upper contact 14212 is contacted with the corresponding lower contact 14112 through a corresponding perforation 1431. In such way, the corresponding membrane switch 144 is electrically conducted, and the membrane wiring board 14 generates a corresponding key signal. When the depressing force exerted on the keycap 151 is eliminated, an elastic force provided by the elastic element 152 is acted on the keycap 151. In response to the elastic force, the keycap 151 is moved upwardly and returned to its original position.

The plural light-emitting elements 16 are aligned with the corresponding key structures 15. That is, one light-emitting element 16 is disposed under one key structure 15. Each light-emitting element 16 emits light beams L1 to the keycap 151 of the corresponding key structure 15. Moreover, the light beams L1 are outputted from plural light-transmissible regions 1511~1514 of the keycap 151 to produce the illuminating efficacy.

However, the conventional luminous keyboard 1 still has the following drawbacks. For example, the location of the light-emitting element 16 is restricted by the locations of the connecting element 153 and the elastic element 152 of each key structure 15. That is, the location of the light-emitting element 16 is deviated from the center of the key structure 15. Since the location of the light-emitting element 16 is deviated, the luminous uniformity of the conventional luminous keyboard is usually unsatisfied. For example, if the light-emitting element 16 is directly under the light-transmissible regions 1511 and 1512, the light-transmissible regions 1511 and 1512 are much brighter than the light-transmissible regions 1513 and 1514. In other words, the conventional luminous keyboard needs to be further improved.

SUMMARY OF THE INVENTION

The present invention relates to a luminous keyboard. A light guide cover is arranged between a keycap and a membrane wiring board. The light beams generated by a light-emitting element are guided to the keycap by the light guide cover. Consequently, plural light-transmissible regions of the keycap have uniform luminous efficacy.

In accordance with an aspect of the present invention, there is provided a luminous keyboard. The luminous keyboard includes a membrane wiring board, plural key structures corresponding to the plural membrane switches, plural light-emitting elements corresponding to the plural key structures, and plural light guide covers corresponding to the plural key structures. The membrane wiring board includes plural membrane switches. Each of the plural key structures includes a keycap and an elastic element. The keycap has at least one light-transmissible region. The elastic element is arranged between the keycap and the membrane wiring board and includes a sustaining part. When the keycap is depressed, the elastic element is compressed, so that the corresponding membrane switch is pushed by the sustaining part. When the keycap is not depressed, the keycap is returned to an original position in response to an elastic force provided by the elastic element. Each of the plural light guide covers is disposed under the corresponding keycap and surrounds the corresponding elastic element. An upper portion of the elastic element is penetrated through the light guide cover and contacted with the keycap. Each of the plural light guide covers receives plural light beams from the corresponding light-emitting element. The plural light beams are guided to the corresponding keycap by the light guide cover. Consequently, the plural light beams are outputted from the at least one light-transmissible region of the corresponding keycap.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
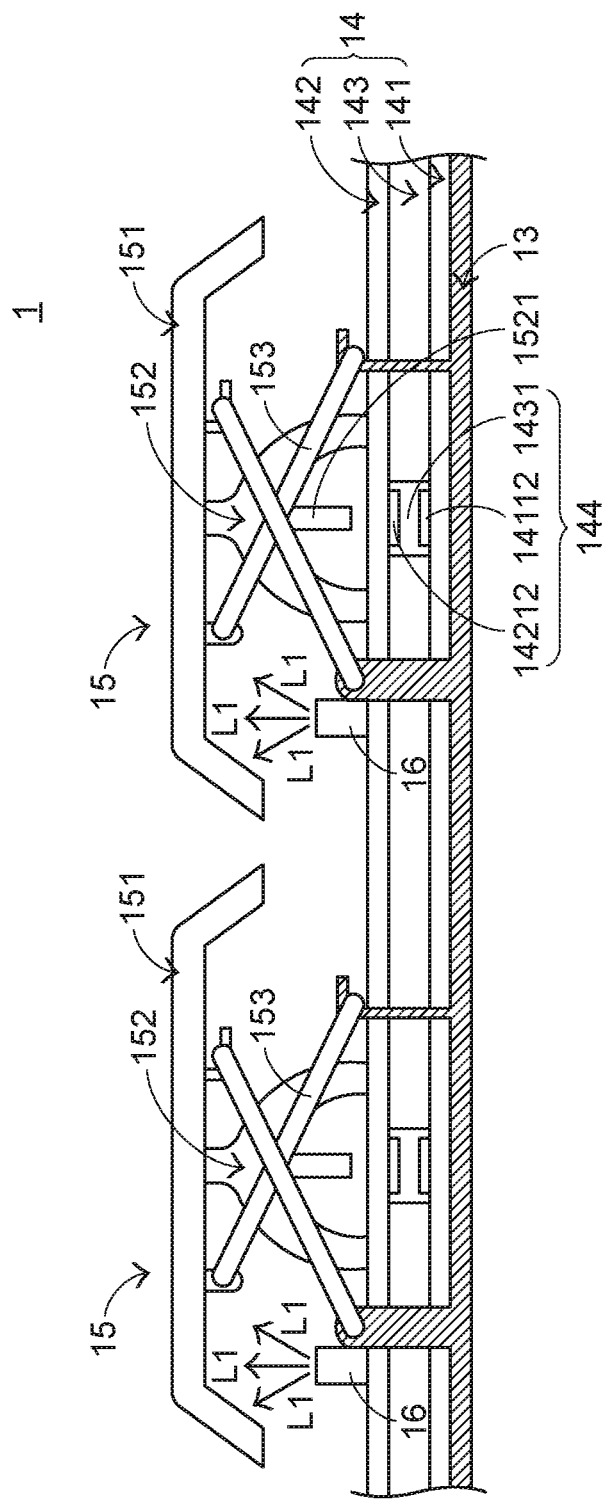
FIG. 1 is a schematic side view illustrating a conventional luminous keyboard.
Figure 2:
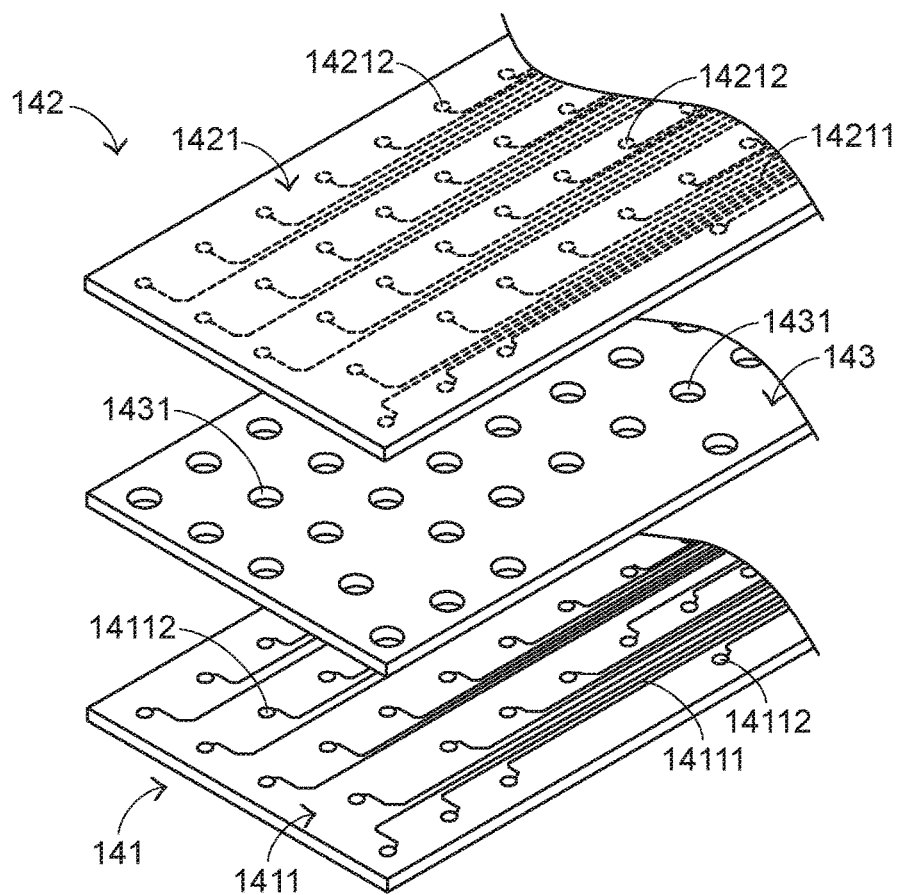
FIG. 2 is a schematic exploded view illustrating a membrane wiring board of the conventional luminous keyboard of FIG. 1.
Figure 3:
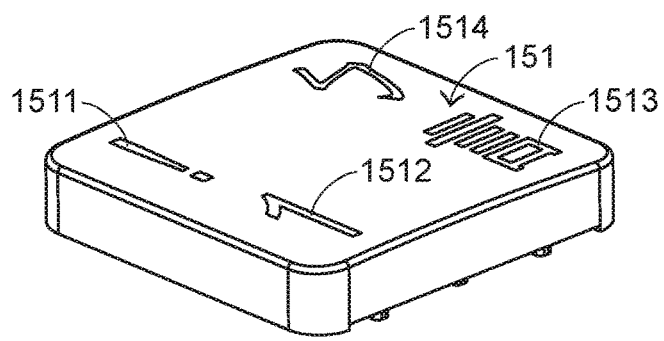
FIG. 3 is a schematic exploded view illustrating a key structure of the conventional luminous keyboard of FIG. 1.
Figure 4:
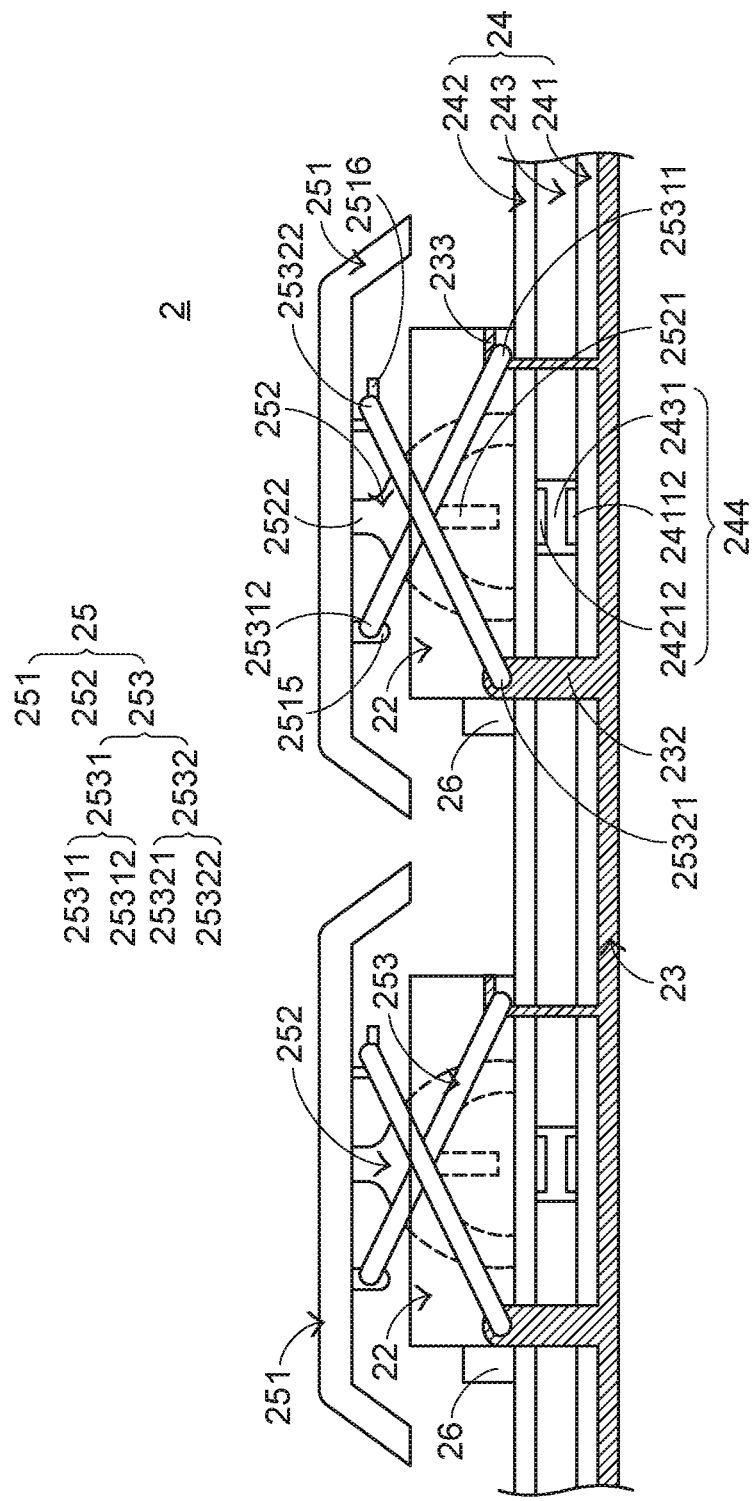
FIG. 4 is a schematic side view illustrating a luminous keyboard according to a first embodiment of the present invention.
Figure 5:
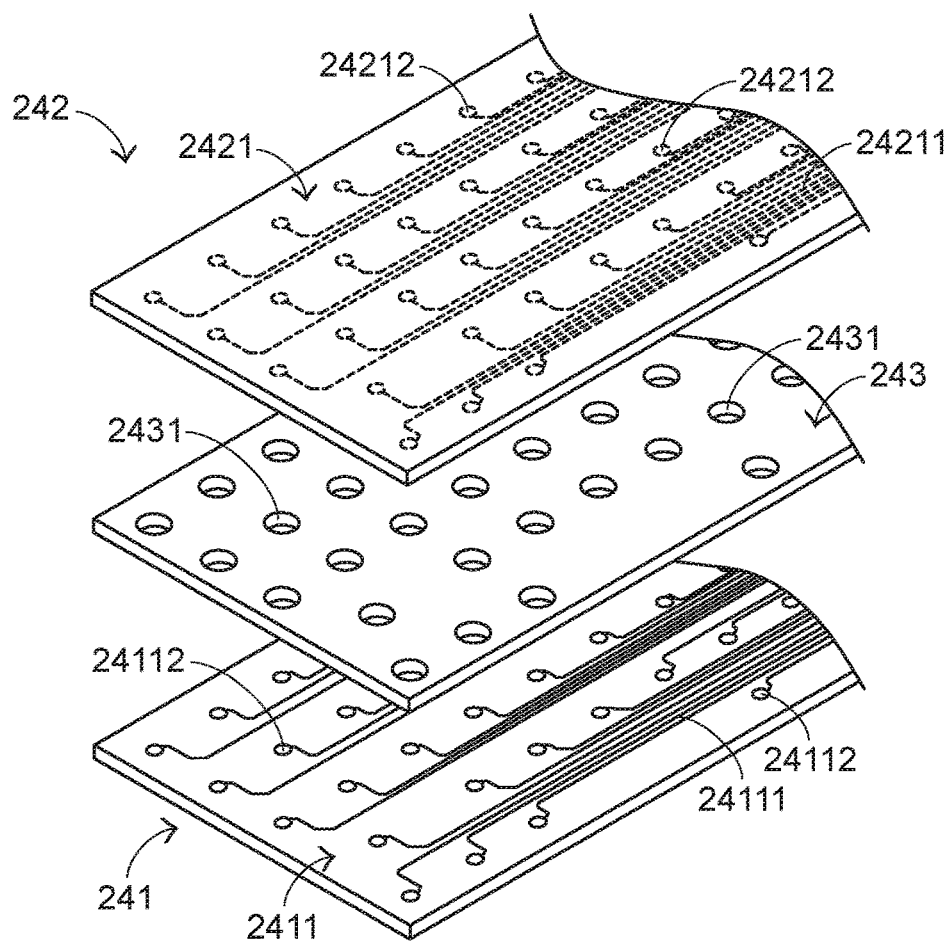
FIG. 5 is a schematic exploded view illustrating a membrane wiring board of the luminous keyboard of FIG. 4.
Figure 6:
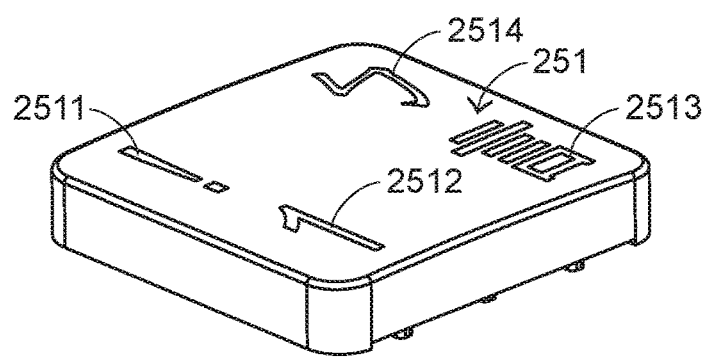
FIG. 6 is a schematic exploded view illustrating a key structure of the luminous keyboard of FIG. 4.
Figure 7:
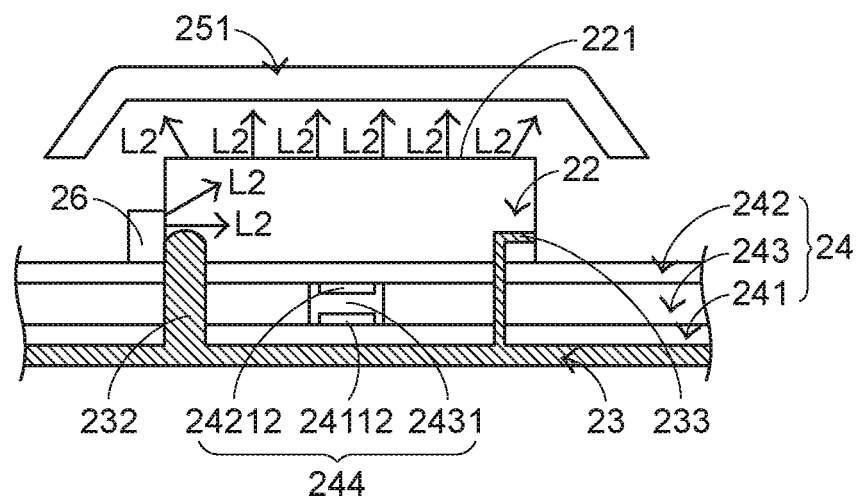
FIG. 7 schematically illustrates the optical path of the luminous keyboard of FIG. 4.

FIG. 4 is a schematic side view illustrating a luminous keyboard according to a first embodiment of the present invention. FIG. 5 is a schematic exploded view illustrating a membrane wiring board of the luminous keyboard of FIG. 4. FIG. 6 is a schematic exploded view illustrating a key structure of the luminous keyboard of FIG. 4. FIG. 7 schematically illustrates the optical path of the luminous keyboard of FIG. 4. As shown in FIGS. 4, 5, 6 and 7, the luminous keyboard 2 comprises a membrane wiring board 24, plural key structures 25, plural light-emitting elements 26, plural light guide covers 22 and a metallic base plate 23. The membrane wiring board 24, the plural key structures 25, the plural light-emitting elements 26 and the plural light guide covers 22 are supported by the metallic base plate 23.

The membrane wiring board 24 comprises a lower wiring plate 241 and an upper wiring plate 242. A first circuit pattern 2411 is formed on a top surface of the lower wiring plate 241. The first circuit pattern 2411 comprises plural silver paste conductor lines 24111 and plural lower contacts 24112. A second circuit pattern 2421 is formed on a bottom surface of the upper wiring plate 242. The second circuit pattern 2421 comprises plural silver paste conductor lines 24211 and plural upper contacts 24212. The plural upper contacts 24212 are aligned with the plural lower contacts 24112, respectively. Each of the upper contacts 24212 and the corresponding lower contact 24112 are separated from each other by a spacing distance. Moreover, each of the upper contacts 24212 and the corresponding lower contact 24112 are collectively defined as a membrane switch 244. For allowing each of the upper contacts 24212 and the corresponding lower contact 24112 to be separated from each other by the spacing distance, the membrane wiring board 24 further comprises an intermediate plate 243. The intermediate plate 243 is arranged between the lower wiring plate 241 and the upper wiring plate 242. The intermediate plate 243 comprises plural perforations 2431 corresponding to the plural lower contacts 24112 and the plural upper contacts 24212, respectively.

The metallic base plate 23 is disposed under the membrane wiring board 24. The plural key structures 25 are connected with the metallic base plate 23. The plural key structures 25 are aligned with the corresponding membrane switches 244. Each key structure 25 comprises a keycap 251, a connecting element 253 and an elastic element 252. The connecting element 253 is connected between the corresponding keycap 251 and the metallic base plate 23. Consequently, the keycap 251 is movable upwardly or downwardly relative to the membrane wiring board 24. The elastic element 252 is arranged between the corresponding keycap 251 and the membrane wiring board 24. Moreover, the elastic element 252 comprises a sustaining part 2521.

In this embodiment, the connecting element 253 is a scissors-type connecting element. Moreover, the scissors-type connecting element 253 comprises a first frame 2531 and a second frame 2532. The metallic base plate 23 further comprises a first fixing structure 232 and a second fixing structure 233. The keycap 251 of each key structure 25 comprises a first keycap connecting structure 2515 and a second keycap connecting structure 2516. A first end 25311 of the first frame 2531 is connected to the second fixing structure 233, and a second end 25312 of the first frame 2531 is connected to the first keycap connecting structure 2515. In addition, a first end 25321 of the second frame 2532 is connected to the first fixing structure 232, and a second end 25322 of the second frame 2532 is connected to the second keycap connecting structure 2516. It is noted that the connection relationships between the connecting element 253, the metallic base plate 23 and the keycap 251 are presented herein for purpose of illustration and description only.

Moreover, as the keycap 251 of any key structure 25 is depressed and moved downwardly relative to the membrane wiring board 24, the first frame 2531 and the second frame 2532 of the corresponding connecting element 253 are switched from an open-scissors state to a folded state. Moreover, in response to the downward movement of the keycap 251, the corresponding elastic element 252 is compressed by the keycap 251, and the corresponding upper contact 24212 is pushed by the sustaining part 2521 of the elastic element 252. Consequently, the corresponding upper contact 24212 is contacted with the corresponding lower contact 24112 through the corresponding perforation 2431, and the corresponding membrane switch 244 is electrically conducted. Under this circumstance, the membrane wiring board 24 generates a corresponding key signal. Moreover, when the depressing force exerted on the keycap 251 of the key structure 25 is eliminated, the keycap 251 is moved upwardly relative to the membrane wiring board 24 in response to the elastic force of the elastic element 252.

Under this circumstance, the first frame 2531 and the second frame 2532 are switched from the folded state to the open-scissors state, and the keycap 251 is returned to its original position.

The plural light-emitting elements 26 are aligned with the corresponding key structures 25. That is, one light-emitting element 26 is disposed under the keycap 251 of the corresponding key structure 25. The light-emitting element 26 provides light beams L2. Moreover, plural light-transmissible regions are formed at different locations of each keycap 251. In an embodiment as shown in FIG. 6, the plural light-transmissible regions includes a first light-transmissible region 2511, a second light-transmissible region 2512, a third light-transmissible region 2513 and a fourth light-transmissible region 2514. The first light-transmissible region 2511 has a symbol profile. The second light-transmissible region 2512, the third light-transmissible region 2513 and the fourth light-transmissible region 2514 have character profiles. Moreover, the light beams L2 generated by the light-emitting element 26 are outputted from plural light-transmissible regions 2511~2514 of the keycap 251 to produce the illuminating efficacy.

The light guide covers 22 of the luminous keyboard 2 are aligned with the corresponding key structures 25. Each light guide cover 22 is disposed under the corresponding keycap 251 to surround the corresponding elastic element 252. An upper portion 2522 of the elastic element 252 is penetrated through the light guide cover 22 and contacted with the keycap 251. In an embodiment, each light-emitting element 26 is located adjacent to an outer surface of the corresponding light guide cover 22. Consequently, the light guide cover 22 can receive the light beams L2 from the corresponding light-emitting element 26. After the light beams L2 are guided by the light guide cover 22, the light beams L2 are uniformly projected from a top surface 221 of the light guide cover 22 to the corresponding keycap 251. Consequently, the light beams L2 are outputted from the light-transmissible regions 2511~2514 of the keycap 251. For succinctness, only some components are shown in FIG. 7. Preferably but not exclusively, each light guide cover is made of polycarbonate (PC) or polymethylmethacrylate (PMMA).

Since the location of the light-emitting element 26 is restricted by the locations of the connecting element 253 and the elastic element 252 of the corresponding key structure 25, the location of the light-emitting element 26 is deviated from the center of the key structure 25. However, since the light beams L2 generated by the light-emitting element 26 are guided by the corresponding light guide cover 22, the light beams L2 are uniformly projected to the corresponding keycap 251. Consequently, the plural light-transmissible regions 2511~2514 of the keycap 251 have equal brightness.

Figure 8:
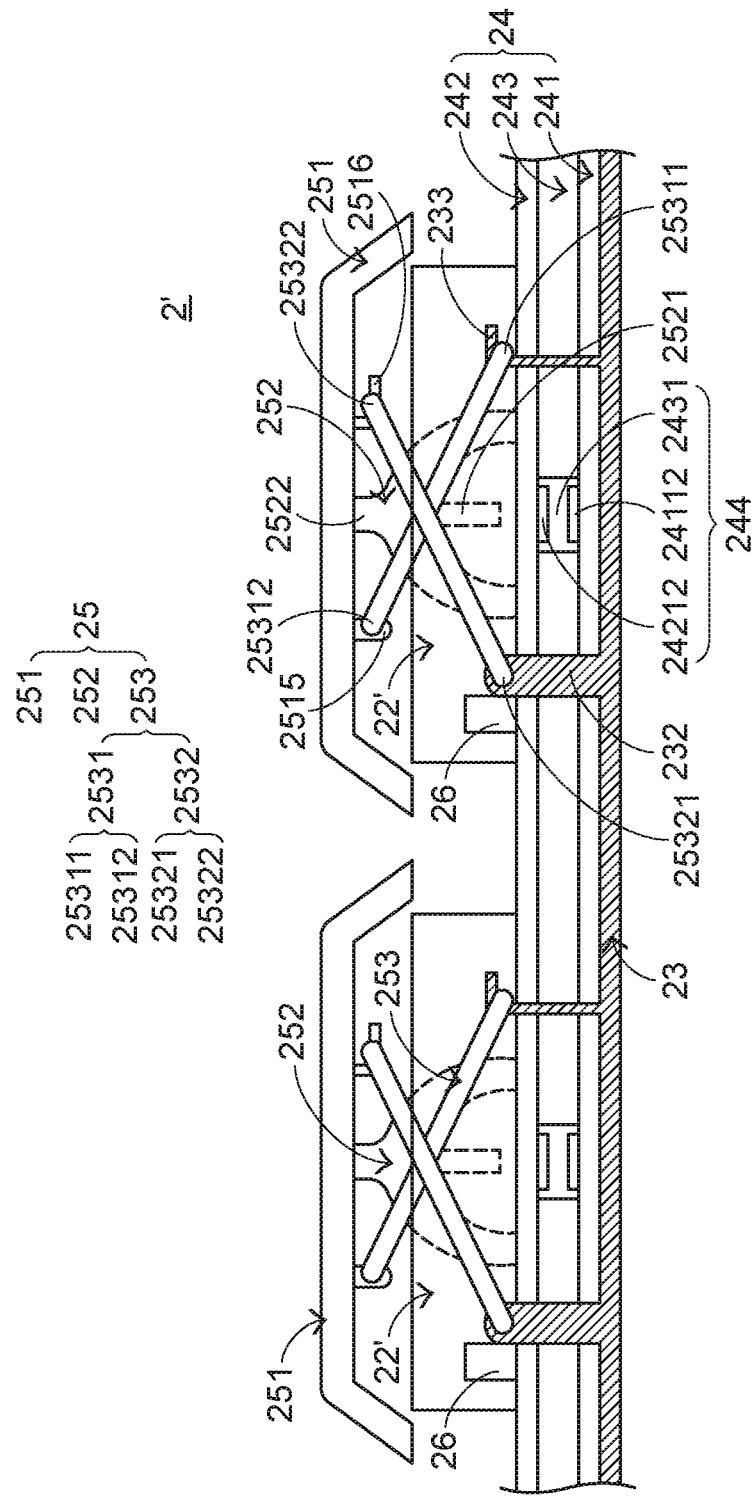
FIG. 8 is a schematic side view illustrating a luminous keyboard according to a second embodiment of the present invention.
Figure 9:
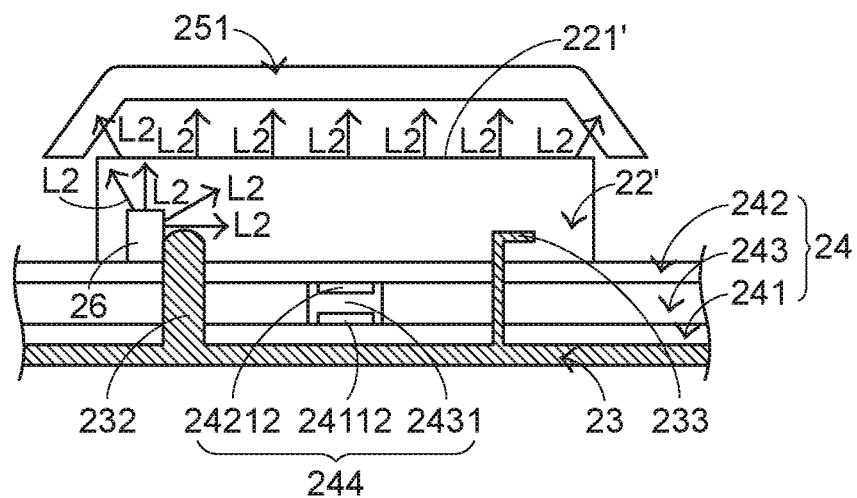
FIG. 9 schematically illustrates the optical path of the luminous keyboard of FIG. 8.

Please refer to FIGS. 8 and 9. FIG. 8 is a schematic side view illustrating a luminous keyboard according to a second embodiment of the present invention. FIG. 9 schematically illustrates the optical path of the luminous keyboard of FIG. 8. Except that each light-emitting element 26 is covered by the corresponding light guide cover 22', the other components of the luminous keyboard 2' are similar to those of the luminous keyboard of the first embodiment, and are not redundantly described herein. Similarly, the light guide cover 22' can receive the light beams L2 from the corresponding light-emitting element 26. After the light beams L2 are guided by the light guide cover 22', the light beams L2 are uniformly projected from a top surface 221' of the light guide cover 22 to the corresponding keycap 251. Consequently, the light beams L2 are outputted from the light-transmissible regions 2511~2514 of the keycap 251.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A luminous keyboard, comprising:
   a membrane wiring board comprising plural membrane switches;
   plural key structures corresponding to the plural membrane switches, wherein each of the plural key structures comprises a keycap and an elastic element, wherein the keycap has at least one light-transmissible region, and the elastic element is arranged between the keycap and the membrane wiring board and comprises a sustaining part, wherein when the keycap is depressed, the elastic element is compressed, so that the corresponding membrane switch is pushed by the sustaining part, wherein when the keycap is not depressed, the keycap is returned to an original position in response to an elastic force provided by the elastic element;
   plural light-emitting elements corresponding to the plural key structures; and
   plural light guide covers corresponding to the plural key structures, wherein each of the plural light guide covers is disposed under the corresponding keycap and surrounds the corresponding elastic element, and an upper portion of the elastic element is penetrated through the light guide cover and contacted with the keycap, wherein each of the plural light guide covers receives plural light beams from the corresponding light-emitting element, and the plural light beams are guided to the corresponding keycap by the light guide cover, so that the plural light beams are outputted from the at least one light-transmissible region of the corresponding keycap.

2. The luminous keyboard according to claim 1, wherein each of the plural light-emitting elements is arranged between the corresponding keycap and the membrane wiring board, and each of the plural light-emitting elements is located adjacent to an outer surface of the corresponding light guide cover.

3. The luminous keyboard according to claim 1, wherein each of the plural light-emitting elements is arranged between the corresponding keycap and the membrane wiring board, and each of the plural light-emitting elements is covered by the corresponding light guide cover.

4. The luminous keyboard according to claim 1, wherein at least one of the plural light guide covers is made of polycarbonate (PC) or polymethylmethacrylate (PMMA).

5. The luminous keyboard according to claim 1, wherein the at least one light-transmissible region of the keycap includes a first light-transmissible region and a second light-transmissible region, and the first light-transmissible region and the second light-transmissible region are formed at different location of the keycap.

6. The luminous keyboard according to claim 5, wherein at least one of the first light-transmissible region and the second light-transmissible region has a character profile or a symbol profile.

7. The luminous keyboard according to claim 1, wherein the membrane wiring board comprises:

a lower wiring plate having a first circuit pattern, wherein the first circuit pattern comprises plural lower contacts; and an upper wiring plate having a second circuit pattern, wherein the second circuit pattern comprises plural upper contacts corresponding to the plural lower contacts, wherein each of the upper contacts and the corresponding lower contact are separated from each other by a spacing distance, and each of the upper contacts and the corresponding lower contact are collaboratively defined as the corresponding membrane switch.

8. The luminous keyboard according to claim 7, wherein the membrane wiring board further comprises an intermediate plate, wherein the intermediate plate is arranged between the upper wiring plate and the lower wiring plate, so that each of the upper contacts and the corresponding lower contact are separated from each other by the spacing distance, wherein the intermediate plate comprises plural perforations corresponding to the plural lower contacts and the plural upper contacts.

9. The luminous keyboard according to claim 1, further comprising a metallic base plate, wherein the membrane wiring board, the plural key structures, the plural light guide covers and the plural light-emitting elements are supported by the metallic base plate.

10. The luminous keyboard according to claim 9, wherein each of the plural key structures further comprises a connecting element, and connecting element is arranged between the metallic base plate and the keycap, wherein the keycap is movable upwardly or downwardly relative to the metallic base plate through the connecting element.

* * * * *